United States Patent
Chen et al.

(10) Patent No.: US 11,039,125 B2
(45) Date of Patent: Jun. 15, 2021

(54) TEST METHOD AND SYSTEM FOR WEARABLE DEVICE

(71) Applicant: BOE Technology Group Co., Ltd., Beijing (CN)

(72) Inventors: Saihua Chen, Beijing (CN); Heliang Di, Beijing (CN); Zhiying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/650,434

(22) PCT Filed: Sep. 21, 2018

(86) PCT No.: PCT/CN2018/107075
§ 371 (c)(1),
(2) Date: Mar. 25, 2020

(87) PCT Pub. No.: WO2019/057176
PCT Pub. Date: Mar. 28, 2019

(65) Prior Publication Data
US 2020/0228792 A1    Jul. 16, 2020

(30) Foreign Application Priority Data

Sep. 25, 2017 (CN) .......................... 201710875140.7

(51) Int. Cl.
*H04N 17/00* (2006.01)
*G02B 27/01* (2006.01)

(52) U.S. Cl.
CPC ............. *H04N 17/00* (2013.01); *G02B 27/01* (2013.01)

(58) Field of Classification Search
CPC ................................. H04N 17/00; G02B 27/01
See application file for complete search history.

(56) References Cited

U.S. PATENT DOCUMENTS

| 5,666,152 A | * | 9/1997 | Stoker | H04N 7/141 348/14.01 |
| 5,874,991 A | * | 2/1999 | Steinberg | H04N 17/00 348/177 |
| 6,771,323 B1 | * | 8/2004 | Dean | G11B 27/034 348/180 |
| 10,277,893 B1 | * | 4/2019 | Yoon | H04N 5/2356 |
| 2018/0332261 A1 | * | 11/2018 | Zhang | H04N 21/4223 |

* cited by examiner

*Primary Examiner* — Sarah Lhymn
(74) *Attorney, Agent, or Firm* — Fay Sharpe LLP

(57) ABSTRACT

The present disclosure discloses a test method and system for a wearable device, and belongs to the field of electronic technology application. The method includes: controlling a wearable device displaying a test image to enter a test process, wherein the test process is a process of changing from a stationary state to a motion state and then to a stationary state along a specified direction; acquiring two images displayed by the wearable device in the test process; and determining display errors of the wearable device according to a difference in specified parameters of the two images.

20 Claims, 17 Drawing Sheets

TEST METHOD AND SYSTEM FOR WEARABLE DEVICE

CROSS-REFERENCE TO RELATED APPLICATION

This application is a 371 of PCT Application No. PCT/CN2018/107075 filed Sep. 21, 2018, which claims priority to Chinese Patent Application No. 201710875140.7, filed Sep. 25, 2017 and entitled "TEST METHOD AND SYSTEM FOR WEARABLE DEVICE", the entire contents of which are incorporated herein by reference.

TECHNICAL FIELD

The present disclosure relates to a test method and system for a wearable device.

BACKGROUND

Virtual reality (VR for short) and augmented reality (AR for short) are both technologies that have been highly favored by the market in recent years. Among them, VR is the technology that generates an interactive three-dimensional environment (i.e., a virtual scene) on a computer using a computer graphics system and various interface devices, and provide users with an immersive perception through the three-dimensional environment, and the AR technology may superimpose a real-world scene with the virtual scene in real time to provide the users with a more enhanced augmented reality scene, and the enriched immerse perception. Among these, the immersive perception refers to the feeling of being placed in the augmented reality scene in a spatial sense when the user perceives the augmented reality scene as the real-world scene.

SUMMARY

The present disclosure provides a test method and system for a wearable device. The technical solutions are as follows:

According to a first aspect of the present disclosure, a test method for a wearable device is provided. The method comprises:

controlling the wearable device displaying a test image to enter a test process, the test process being a process of changing from a stationary state to a motion state and then to a stationary state along a specified direction;

acquiring two images displayed by the wearable device in the test process; and determining display errors of the wearable device according to a difference in specified parameters of the two images.

Optionally, the display errors comprise a time error, the two images comprise a first image and a second image, and the specified parameters are shooting frame number of the first image and a shooting frame number of the second image.

Optionally, acquiring two images displayed by the wearable device in the test process comprises:

shooting, by an image acquisition component, a first image that is actually displayed when the wearable device changes from the motion state to the stationary state; and shooting, by the image acquisition module, a second image that is displayed when the wearable device changes from the motion state to the stationary state, wherein the second image is an end image displayed for the first time, and the end image is an image that should be displayed when the wearable device changes from the motion state to the stationary state if without the time error.

Optionally, determining the display errors of the wearable device according to the difference in the specified parameters of the two images comprises:

determining an absolute value of a difference in the shooting frame number between the first image and the second image according to the shooting frame number of the first image and the shooting frame number of the second image; and determining the time error of the wearable device according to the absolute value of the difference in the shooting frame number and a frame frequency of the image acquisition component.

Optionally, determining the time error of the wearable device according to the absolute value of the difference in the shooting frame number and the frame frequency of the image acquisition component comprises:

determining a time error t of the wearable device based on a time error calculation formula according to an absolute value $|n|$ of the difference in the shooting frame number between the first image and the second image, and a frame frequency f of the image acquisition component, wherein the time error calculation formula is:

$$t = \frac{|n|+1}{f}.$$

Optionally, a display screen of the wearable device further displays a dynamic visual coordinate system, which has a mapping relationship with a world coordinate system; the display errors comprise a movement error; and the specified parameters are scales of the two images on the dynamic visual coordinate system.

Optionally, the two images comprise a third image and a fourth image, and acquiring the two images displayed by the wearable device in the test process comprises:

shooting, by the image acquisition component, the third image that is actually displayed when the wearable device changes from the stationary state to the motion state; and shooting, by the image acquisition component, the fourth image that is actually displayed when the wearable device changes from the motion state to the stationary state.

Optionally, the two images comprise a third image and a fourth image, and determining the display errors of the wearable device according to the difference in specified parameters of the two images comprises:

acquiring an absolute value of a difference in the scales between the fourth image and the third image in the dynamic visual coordinate system;

acquiring a first movement parameter value of the wearable device changing from the stationary state to the motion state and then to the stationary state;

acquiring a second movement parameter value corresponding to the first movement parameter value in the dynamic visual coordinate system based on the mapping relationship between the dynamic visual coordinate system and the world coordinate system, and determining an absolute value of a difference between the absolute value of the difference in the scales and the value of the second movement parameter as a movement error of the wearable device in the dynamic visual coordinate system.

Optionally, when the specified direction is a linear direction, the first movement parameter value and the second movement parameter value are distance values; and when the specified direction is a rotational direction, the first movement parameter value and the second movement parameter value are angle values.

Optionally, controlling the wearable device displaying the test image to enter the test process comprises:

controlling the wearable device to move to a target position at a preset speed from a starting position along a specified direction and then become stationary, wherein the target position is provided with a calibration object; when the wearable device is located at the target position, the calibration object is located between a display screen of the wearable device and an image acquisition component; and the image acquisition component is configured to acquire an image displayed on the display screen.

Optionally, controlling the wearable device to move to the target position at the preset speed from the starting position along the specified direction and then become stationary comprises:

controlling the wearable device to move to the target position at the preset speed constantly from the starting position along a linear direction and then become stationary.

Optionally, controlling the wearable device to move to the target position at the preset speed from the starting position along the specified direction and then become stationary comprises:

controlling the wearable device to move to the target position at a preset and uniform rotation speed from the starting position along a rotational direction and then become stationary.

Optionally, when the specified direction is a linear direction, and the preset speed is any speed value ranging from 0.1 m/s to 5 m/s.

Optionally, when the specified direction is a rotational direction, and the preset speed is any speed value ranging from 1 r/min to 5 r/min.

Optionally, the calibration object is laser light.

In another aspect, a test system for a wearable device is provided. The system comprises:

a controller and an image acquisition component, wherein the controller is configured to control a wearable device displaying a test image to enter a test process, the test process being a process of changing from a stationary state to a motion state and then to a stationary state along a specified direction;

the image acquisition component is configured to acquire two images displayed by the wearable device in the test process; and the controller is further configured to determine display errors of the wearable device based on a difference in specified parameters of the two images.

Optionally, the system further comprises:

a linear slide rail, a first supporting post, and a first test stage, wherein one end of the first supporting post is slidably connected to the linear slide rail, and the other end of the first supporting post is fixedly connected to the first test stage, and a communication connection is established between the controller and the first supporting post, the first test stage is configured for the placement of the wearable device and the image acquisition component, and the controller is configured to control the first supporting post to slide over the linear slide rail.

Optionally, the system further comprises:

a sliding connector, wherein the first supporting post has one end rotatably connected to the sliding connector, and the sliding connector is slidably connected to the linear slide rail.

Optionally, the system further comprises:

a base, a second supporting post, and a second test stage, wherein the second supporting post has one end rotatably connected to the base, and has the other end fixedly connected to the second test stage, and a communication connection is established between the controller and the second supporting post, the test stage is configured for the placement of the wearable device and the image acquisition component, and the controller is configured to control the second supporting post to rotate on the base.

Optionally, the calibration object is laser light, and the system further comprises: a laser emitter configured to provide the laser light.

Optionally, the test image is an augmented reality image or a virtual reality image.

Optionally, the image acquisition component has a frame frequency greater than or equal to a frame frequency at which the wearable device displays an image.

Optionally, the image acquisition component has a frame frequency greater than or equal to 1000 frames/second.

In yet another aspect, a test apparatus for a wearable device is provided. The apparatus comprises:

a processor; and a memory for storing executable instructions of the processor;

wherein when executing the executable instructions, the processor can implement the test method for the wearable device according to any one of claims 1 to 11.

In still yet another aspect, a computer readable storage medium is provided. When instructions in the computer readable storage medium are executed by a processing module, the processing module is enabled to execute the test method for the wearable device according to any one of claims 1 to 11.

DETAILED DESCRIPTION

A wearable device using the VR or AR technology may have display errors when displaying a corresponding image if the state of a user changes from a motion state to a stationary state. That is, an image displayed in the stationary state is not an ideal end image, which is an image that the wearable device should display at a target position in the absence of the display errors, wherein the display errors may include a time error and a distance error.

To the knowledge of the inventor, it is necessary to accurately measure the display errors and correct the image display process of the wearable device based on a test result, in order to avoid the display errors. The process includes: counting the time error of each means of the wearable device, and then using the sum of the time errors of all the means as the time error of the wearable device; also counting the distance error of each means of the wearable device, and then using the sum of the distance errors of all the means as the distance error of the wearable device; and finally, performing display error correction on the wearable device by a technician based on the display errors to reduce the display errors.

However, the display errors calculated in the method above are generally the maximum display errors of the wearable device, which are largely different from the actual display errors. Therefore, the accuracy of the determined display errors is low.

Figure 1:
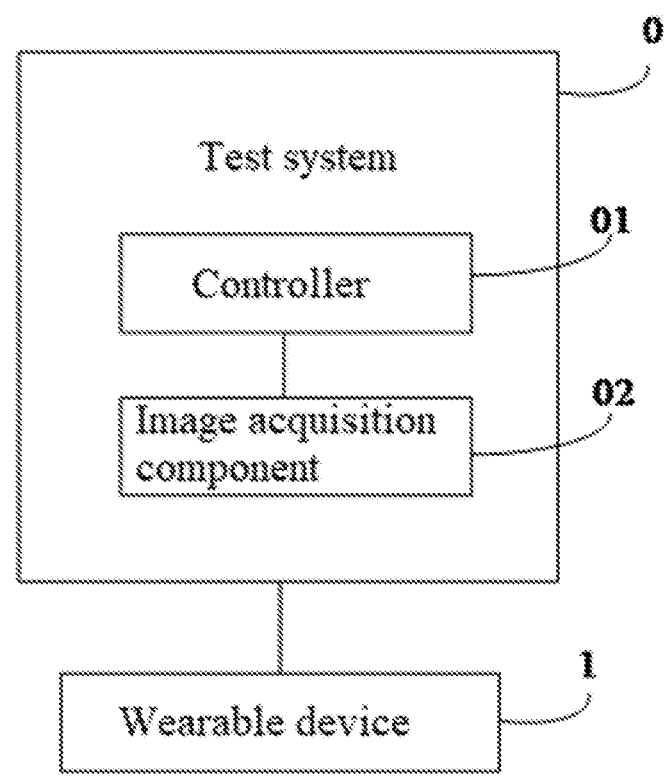
FIG. 1 is a structural block diagram of a test system for a wearable device in accordance with an embodiment of the present disclosure.

An embodiment of the present disclosure provides a test method for a wearable device, which can be applied to a test system 0 for the wearable device. FIG. 1 is a structural block diagram of a test system for a wearable device in accordance with this embodiment of the present disclosure. As shown in FIG. 1, the test system 0 includes:

a controller 01 and an image acquisition component 02, wherein a communication connection is established between the controller 01 and the image acquisition component 02; and the communication connection may be made in a wired or wireless manner. The image acquisition component 02 may be a camera or video camera or other devices that can shoot an image and have the frame frequency greater than or equal to 1000 frames/second. It should be noted that the controller 01 is configured to control the wearable device displaying a test image to enter a test process, and the test process is a process of changing from a stationary state to a motion state and then to a stationary state along a specified direction. The image acquisition component 02 is configured to acquire two images displayed by the wearable device in the test process. The controller 01 is further configured to determine the display errors of the wearable device based on a difference in specified parameters of the two images. Among these, the wearable device 1 may be a pair of smart glasses supporting VR or AR, or a smart helmet supporting VR or AR, and the like.

Figure 2:
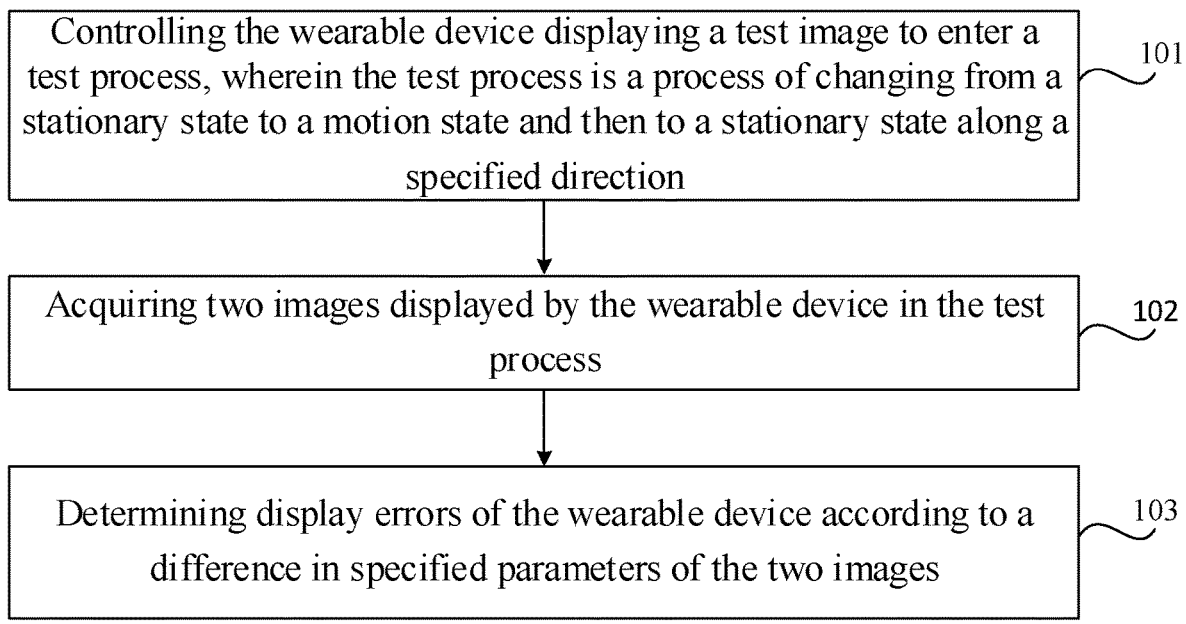
FIG. 2 is a flowchart of a test method for a wearable device in accordance with an embodiment of the present disclosure.

Correspondingly, FIG. 2 is a flowchart of a test method for a wearable device in accordance with this embodiment of the present disclosure. As shown in FIG. 2, the test method for the wearable device includes the following steps.

In Step 101, the wearable device displaying a test image is controlled to enter a test process, where the test process is a process of changing from a stationary state to a motion state and then to a stationary state along a specified direction.

Among these, the specified direction may be either a linear direction or a rotational direction, for example, a direction rotating around an axis.

In Step 102, two images displayed by the wearable device are acquired in the test process.

In Step 103, display errors of the wearable device are determined according to a difference in specified parameters of the two images.

Among these, the specified parameters may be parameters acquired in the test process.

In summary, with the test method provided by this embodiment of the present disclosure, the wearable device displaying a test image is controlled to move upwards in a specified direction, and two images displayed by the wearable device and specified parameters of the two images are acquired, based on which the display errors of the wearable device are determined. Since the accuracy of the measured display errors are obviously higher than the accuracy of the maximum display errors (which include the maximum time error and the maximum distance error, the maximum time error being the sum of the time errors of the respective means of the wearable device, and the maximum distance error being the sum of the distance errors of the respective means of the wearable device), the problem of low display error accuracy is solved, thereby achieving the effect of enabling the effective improvement of the accuracy of the determined display errors.

There are two main types of display errors, namely a time error and a movement error. The time error refers to a time difference value between an image actually displayed by the display screen of the wearable device and an image that should be displayed theoretically after the wearable device moves to the target position, and the movement error refers to a time difference value between a movement distance of the image displayed by the display screen of the wearable device and an actual movement distance of the wearable device after the wearable device moves from a starting position to the target position, or, the movement error refers to a movement difference value between an image rotation angle displayed by the display screen of the wearable device and an actual rotation angle of the wearable device after the wearable device moves from the starting position to the target position. Among these, the time error may also include a time error generated during the movement along a linear direction and a time error generated during the rotation along a rotational direction; and the movement error may also include a distance error and an angle error. The display errors are illustrated, by way of example, in the following two aspects in this embodiment of the present disclosure.

In the first aspect, when the display error is the time error, the two images in Step 102 above include a first image and a second image; and the specified parameters above are a shooting frame number of the first image (i.e. a frame number corresponding to the appearance of the first image in an image sequence shot by the image acquisition component in the process of shooting the first image) and a shooting frame number of the second image (i.e. a frame number corresponding to the appearance of the second image in an image sequence shot by the image acquisition component in the process of shooting the second image). The first and second images are those in line with a first preset condition, for example, the first image is the one actually displayed when the wearable device changes from the motion state to the stationary state, the second image is an end image displayed for the first time when the wearable device changes from the motion state to the stationary state, and the end image should be an ideal image, which is the one that the wearable device should display when changing from the motion state to a stationary state in the absence of the display errors, In an alternative implementation, the first preset condition above may also be other cases. For example, the first image is a posterior d1-frame image of an image actually displayed when the wearable device changes from the motion state to the stationary state, and the second image is a posterior d2-frame image of an end image first displayed when the wearable device changes from the motion state to the stationary state. Both d1 and d2 are positive integers, for example, d1=1 or 2, d2=1 or 2, alternatively, d1=d2, or, d1 may not be equal to d2; and for example, an absolute value of a difference between the two is less than 2, as long as the accuracy of the time error calculated subsequently is within an acceptable error range.

Figure 3:
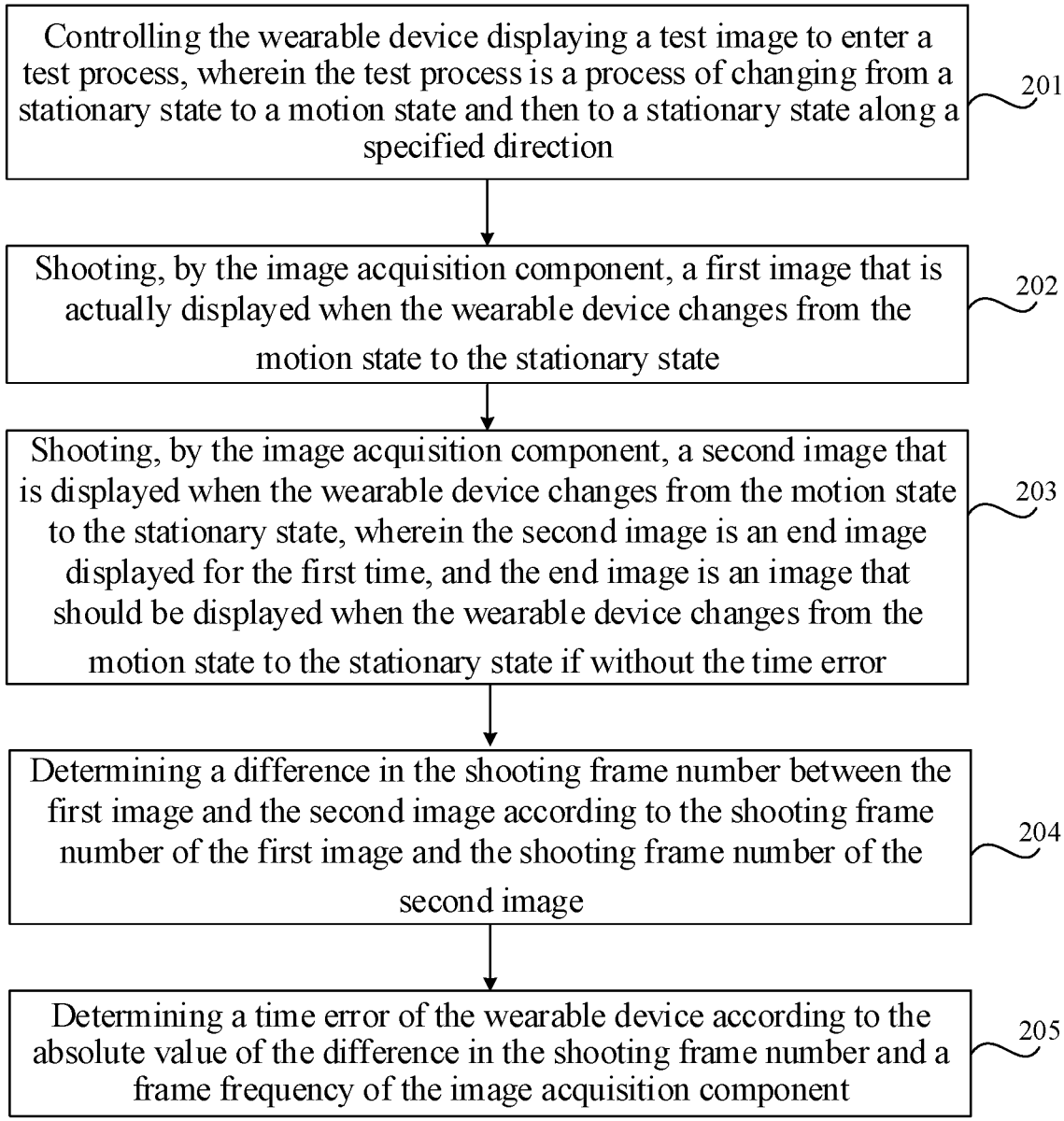
FIG. 3 is a flowchart of another test method for a wearable device in accordance with an embodiment of the present disclosure.

As an example, it is assumed that the first image is an image that is actually displayed when the wearable device changes from the motion state to the stationary state, and the second image is an end image that is first displayed when the wearable device changes from the motion state to the stationary state. Then, the embodiment of the present disclosure provides a test method for a wearable device, and the method can be applied to the system shown in FIG. 1. FIG. 3 is a flowchart of another test method for a wearable device in accordance with an embodiment of the present disclosure. As shown in FIG. 3, the test method includes the following steps.

In Step 201, the wearable device displaying a test image is controlled to enter a test process, where the test process is a process of changing from a stationary state to a motion state and then to a stationary state along a specified direction.

The wearable device is in the stationary state at the starting position, and the controller may control the wearable device to move to a target position at a preset speed from a starting position along a specified direction and then become stationary.

Among these, the test image changes with the motion of the wearable device and may be the same as the image displayed during the real-world use of the wearable device. The test image used in this embodiment of the present disclosure may be an AR image or a VR image, and may also be a panoramic video, or a video processed from the panoramic video, or a synthetic video with an effect similar to that of the panoramic video. The panoramic video is a video shot by a 3D camera through 360-degree shooting, and can be adjusted with up, down, left and right at will for the convenience of watching when a user is watching the video.

The starting position and the target position are typically pre-set by a tester, and are generally fixed positions. The target position may be provided with a calibration object to facilitate the image acquisition component to effectively shoot an image. When the wearable device is located at the target location, the calibration object is located between the display screen of the wearable device and the image acquisition component, the lens of which needs to face the display screen of the wearable device since the image acquisition component is configured to acquire the image displayed on the display screen of the wearable device. Then, when the wearable device is located at the target position, the calibration object is located between the display screen of the wearable device and the lens of the image acquisition component, so that the image acquisition component can simultaneously shoot the calibration object and the image displayed by the display screen. The calibration object is configured to identify a change process of a display screen on the display screen of the wearable device within the time error, may accurately identify the target position, and may be used as a reference for the image acquisition component during shooting. The calibration object in this embodiment of the present disclosure may be laser light, which may be purple, red or blue. Furthermore, the calibration object may also be an entity, for example a very fine line that is visually observable, such as a metal wire, with an easily identifiable color such as red and black.

Alternatively, in order to better simulate the movement form of the wearable device in actual operation, the specified direction may be a linear direction or a rotational direction, and the movement process of the wearable device may be at constant or inconstant speed. For the convenience of testing, the movement process of the wearable device is typically at the constant speed. Then, the test process above may include: when the specified direction is a linear direction, the controller controls the wearable device to move at a preset speed constantly along the linear direction from the starting position to the target position and then become stationary, for example, the preset speed may be any speed value from 0.1 m/s to 5 m/s, such as 3 m/s; and when the specified direction is the rotational direction, the controller controls the wearable device to rotate at a preset rotation speed constantly along the rotational direction from the starting position to the target position and then become stationary, for example, the preset speed may be any speed value from 1 r/min to 5 r/min, such as 3 r/min.

In Step 202, the image acquisition component shoots a first image that is actually displayed when the wearable device changes from the motion state to the stationary state.

The image acquisition component may be a camera, a video camera, or other devices that may shoot an image, and have a frame frequency that may be greater than or equal to the frame frequency of the display image of the wearable device. This ensures the image acquisition component may accurately capture the change in the frame number of the image on the display screen enables of the wearable device, so that a finally determined time error is at least accurate to the frame, thereby improving the accuracy for acquiring the time error. The higher the frame frequency of the image acquisition component is, the higher the accuracy of the finally acquired time error is. In this embodiment of the present disclosure, the frame frequency of the image acquisition component may be greater than or equal to 1000 frames/second.

This embodiment of the present disclosure is illustrated, by way of example, whereas a video camera with the frame frequency of 1000 frames/second is used as the image acquisition component. The lens of the video camera may aim and focus at a monocular display screen (hereinafter referred to as the display screen) of the wearable device, so that an image shot by the lens of the video camera is clearly visible. The lens of the video camera may carry out shooting since the wearable device starts moving, and thus may capture a set of images during the motion of the wearable device. The set of images records a plurality of images that are shot continuously by the video camera and contains the display screen of the wearable device. The controller may extract, from the set of images, a first image when the wearable device reaches the target position, i.e., the first image when the wearable device changes from the motion state to the stationary state. In this embodiment of the present disclosure, the appearance time of the first image (i.e., the time corresponding to the shooting frame number) is considered to be the time when the wearable device becomes stationary actually. However, due to the presence of the display errors, the image displayed on the wearable device does not become stationary at that time. Since the target position may configure the calibration object, the first image shot when the wearable device changes from the motion state to the stationary state is the image displayed on the wearable device when the first image, which is a calibration object is presented on the display screen of the wearable device for the first time. The final images shot by the video camera include the first image and an image of the calibration object at the target position.

The wearable device typically has a binocular display screen, and the corresponding image acquisition component may have two lenses and thus may be, for example, a binocular video camera. With the two lenses, the images displayed on the binocular display screen may be acquired respectively. For the process of acquiring the image by each lens, please refer to the process described above, and the details will not be repeated here.

In Step 203, the image acquisition component shoots a second image that is displayed when the wearable device changes from the motion state to the stationary state. The second image is an end image displayed for the first time, and the end image is an image that should be displayed when the wearable device changes from the motion state to the stationary state if without the time error.

The second image is the end image displayed for the first time. Since the end image is continuously displayed after the wearable device returns to the stationary state, i.e., keeping displaying the end image unchanged, the image acquisition component may shoot plurality of end images during consecutive shooting. In the embodiment of the present disclosure, the time at which the end image is displayed for the first time (i.e., the time corresponding to the shooting frame number of the second image) is determined as the time at which the image on the wearable device becomes stationary actually.

As an example, the controller may extract the first end image shot by the video camera from the set of images acquired in Step 201 as the second image above; and since the target position may be provided with the calibration object, the images finally shot by the video camera include the second image and an image of the calibration object that is at the target location.

In Step 204, a difference in the shooting frame number between the first image and the second image is determined according to the shooting frame number of the first image and the shooting frame number of the second image.

As an example, if the image acquisition component is a video camera, the shooting frame number of the first image and the shooting frame number of the second image are obtained from the video camera. Alternatively, one shooting frame may be recorded for each image in the set of images acquired in step 202; the images in the set of images are then in one-to-one correspondence to the plurality of shooting frames; and the shooting frame number of the first image and the shooting frame number of the second image may be determined from the shooting frame number corresponding to the set of images. For example, the shooting frame number of the first image is 800, the shooting frame number of the second image is 899, the absolute value of a difference in the shooting frame number between the first image and the second image is 99, and the frame frequency of the video camera is 1000 frames/second.

In Step 205, a time error of the wearable device is determined according to the absolute value of the difference in the shooting frame number and a frame frequency of the image acquisition component.

Within the time error t, a frame number error corresponding to the time error t, i.e., the absolute value of the difference in the shooting frame number between the first image and the second image, may be calculated according to the frame frequency of the image acquisition component.

Among these, Step 205 may include:

determining the time error t of the wearable device based on a time error calculation formula according to an absolute value $|n|$ of the difference in the shooting frame number between the first image and the second image, and a frame frequency f of the image acquisition component, wherein the time error calculation formula is:

$$t = \frac{|n| + 1}{f}.$$

For example, the absolute value $|n|$ of the difference in the shooting frame number between the first image and the second image is 99 frames, the frame frequency f of the video camera is 1000 frames/second, and by substituting the above $|n|$ and f into the formula:

$$t = \frac{|n| + 1}{f},$$

the time error t may be calculated as 0.1 second.

In summary, the test method according to this embodiment of the present disclosure includes the following steps: controlling the wearable device displaying the test image to move upwards in the specified direction; acquiring the first image and the second image displayed by the wearable device; and determining the time error of the wearable device according to the absolute value of the difference in the frame number of the two images. As accuracy of the measured time error is significantly higher than that of the maximum time error, the problem of low accuracy of the time error is solved, thereby the accuracy of the determined time error is effectively improved.

When the user wears the wearable device for VR or AR experience, the user may move either along a linear direction (for example, walking or running along one direction) or along a rotational direction (for example, turning a corner or turning back somewhere). Therefore, in the test system for the wearable device according to the present disclosure, the time errors to be measured for the wearable system include two types of errors, namely, a time error generated during the movement along the linear direction and a time error generated during the movement along the rotational direction. From the time error calculation formula described above, it may be seen that the time error in this embodiment of the present disclosure is related to the absolute value $|n|$ of the difference in the shooting frame number of the two images and the shooting frame frequency f of the image acquisition component. Thus, the method of calculating the time error generated during the movement along the linear direction and the time error generated during the movement along the rotational direction may be referred to steps 201 to 205; yet there is a slight difference in the structure of the test system with respect to the time error generated during the movement along the linear direction and the time error generated during the movement along the rotational direction, which will be described below in detail.

In the embodiment of the present disclosure, the test system for the wearable device may implement the test of the time error and the movement error through various structures. This embodiment of the present disclosure is illustrated with the following two implementations as an example.

Figure 4:
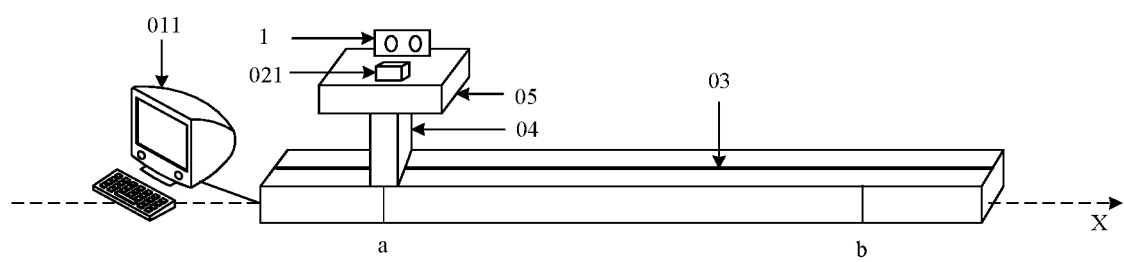
FIG. 4 is a schematic diagram of a structure of a first subsystem of a test system for a wearable device in accordance with an embodiment of the present disclosure.
Figure 5:
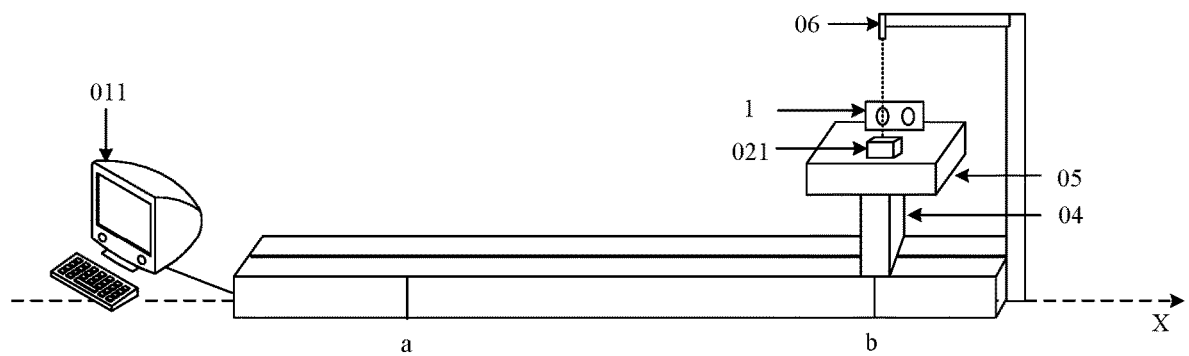
FIG. 5 is a schematic diagram of a structure of a first subsystem of another test system for a wearable device in accordance with an embodiment of the present disclosure.

In the first implementation, the test system for the wearable device may be provided with two subsystems respectively; and the two subsystems include a first subsystem and a second subsystem, with the first subsystem configured to test a time error when the specified direction in which the wearable device moves is the linear direction, and the second subsystem configured to test a time error when the specified direction in which the wearable device moves is the rotational direction. The two subsystems may be provided with a controller and an image acquisition component, respectively or collectively. In this embodiment of the present disclosure, it is assumed that the two subsystems are provided with the controller and the image acquisition component respectively. FIG. 4 and FIG. 5 are schematic diagram of a structures of the first subsystem of the test system for the wearable device in accordance with this embodiment of the present disclosure. As shown in FIG. 4 and FIG. 5, the controller 01 of the test system 0 for the wearable device includes a first controller 011 located in the first subsystem and a second controller 012 located in the second subsystem. The image acquisition component 02 of the test system 0 for the wearable device includes a first image acquisition component 021 located in the first subsystem and a second image acquisition component 022 located in the second subsystem.

Then the structures of the first and second subsystem are as follows respectively.

As shown in FIG. 4, the first subsystem includes: a first controller 011, a first image acquisition component 021, a linear slide rail 03, a first supporting post 04, and a first test stage 05, wherein the first supporting post 04 has one end slidably connected to the linear slide rail 03, and has the other end fixedly connected to the first test stage 05; there is communication connection established between the first controller 011 establishes and the first supporting post 04; and the communication connection may be made in a wired or wireless manner.

The first test stage 05 is configured for the placement of the wearable device 1 and the image acquisition component 021; the first controller 011 is configured to control the first supporting post 04 to slide on the linear slide rail; and the first supporting post 04 is configured to support the first test stage 05 to slide on the linear slide 03, and may be adaptively adjusted in the shape and structure to support the first test stage 05.

As an example, the first test stage 05 may be configured to include a first fixing component for fixing the wearable device 1 and a second fixing component for fixing the first image acquisition component 021. For example, the wearable device 1 is a pair of smart glasses that support AR or VR, the first fixing component is then a glasses holder, the first image acquisition component 021 may be a video camera, and the second fixing component is a video camera holder.

Illustratively, a starting position a and a target position b may be calibrated on the linear slide 03. When Step 201 above is performed, the first controller 011 may control the first supporting post 04 to slide on the linear slide rail 03, so that the first supporting post 04 drives the first test stage 05, which is equipped with the wearable device 1 and the first image acquisition component 021, to move to the target position b along an extension direction of the linear slide rail and to enter the test process, wherein the specified direction is the extension direction of the linear slide rail 04. In the test process, the wearable device 1 continuously displays the test image, and the first image acquisition component 021 continuously shoots the display screen of the wearable device 1 and transmits a shot image to the first controller 011. Then, the first controller 011 performs Steps 202 to 205 above according to the acquired image.

As shown in FIG. 5, the first subsystem may further include: a laser emitter 06 configured to provide laser light. The laser emitter 06 may be disposed at a position corresponding to the target position, for example at a side of the target position. The laser emitter 06 is configured to emit the laser light to a place between the display screen of the wearable device 1 and the lens of the first image acquisition component 021 when the wearable device 1 is at the target position.

Correspondingly, when Step 201 above is performed, the laser emitter 06 emits the laser light to a place between the display screen of the wearable device 1 and the lens of the first image acquisition component 021. In one aspect, the laser emitter 06 may emit the laser light when the wearable device 1 reaches the target position. As an example, the laser emitter 06 may be provided with a timer, which starts counting-down when the wearable device 1 starts moving and stops counting-down when the wearable device 1 stops moving. That triggers the laser emitter 06 to emit the laser light, wherein the duration of the counting-down is calculated according to a distance from the starting position a of the linear slide 03 to the target position b and the moving speed of the first supporting post 04. In another aspect, the laser emitter 06 may also continuously emit the laser light throughout the test process to avoid the influence of a laser emission delay on a finally determined time error, thereby further improve the test accuracy.

Figure 6:
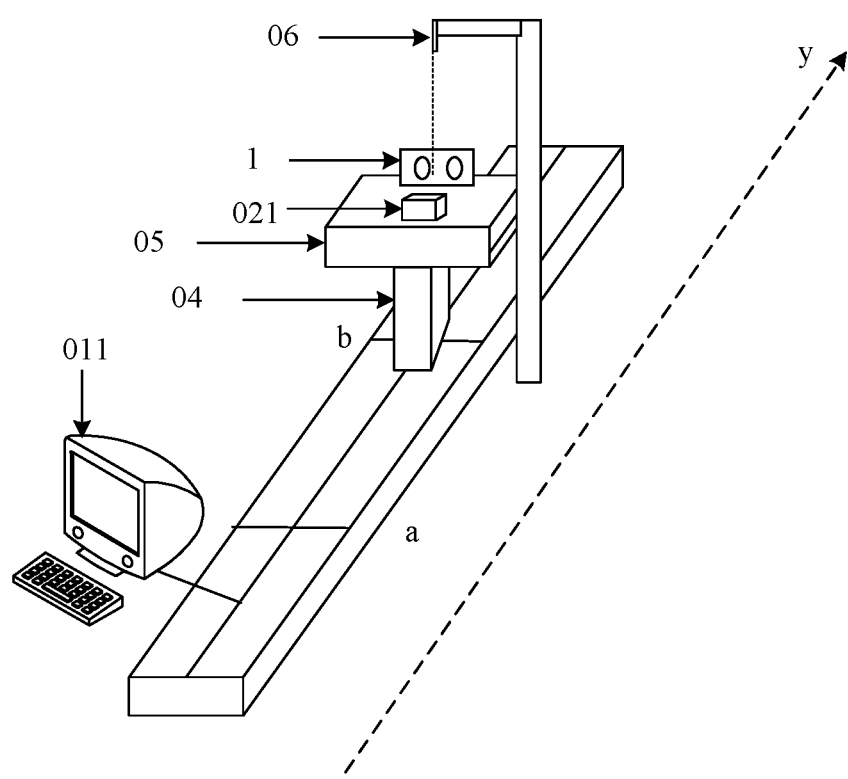
FIG. 6 is a schematic diagram of a structure of a first subsystem of another test system for a wearable device in accordance with an embodiment of the present disclosure.
Figure 7:
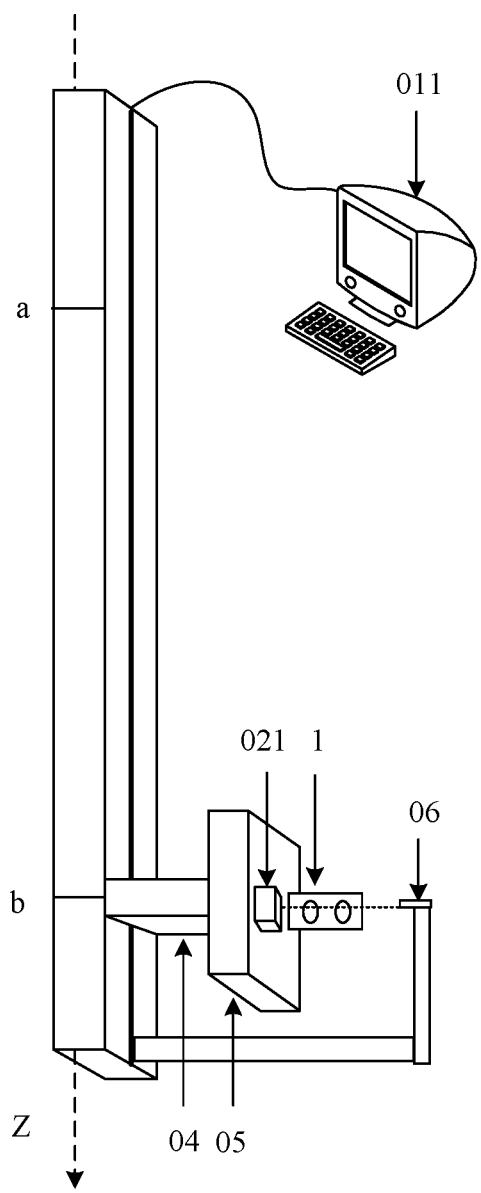
FIG. 7 is a schematic diagram of a structure of a first subsystem of another test system for a wearable device in accordance with an embodiment of the present disclosure.

In an alternative implementation, the linear slide rail 03 above is adjustable in position, and when the position of the linear slide rail changes, the self positions of the other devices in the test system for the wearable device may be adjusted in accordance with the linear slide rail as a reference system. Correspondingly, the specified direction above is a different direction. For example, when the linear slide rail is horizontally disposed along an x-axis as shown in FIG. 4 or FIG. 5, the specified direction may be from left to right (a scene simulated at this time is the one in which the user wearing the wearable device moves from left to right) or from right to left (a scene simulated at this time is the one in which the user wearing the wearable device moves from right to left). FIG. 6 is a schematic diagram of a structure of the first subsystem of another test system for the wearable device in accordance with this embodiment of the present disclosure. When the linear slide is horizontally disposed along a y-axis as shown in FIG. 6, the specified direction may be from front to back (a scene simulated at this time is the one in which the user wearing the wearable device moves from front to back) or from back to front (a scene simulated at this time is the one in which the user wearing the wearable device moves from back to front). FIG. 7 is a schematic diagram of a structure of the first subsystem of another test system for the wearable device in accordance with this embodiment of the present disclosure. When the linear slide is vertically disposed along a z-axis (for example, a direction vertical to the ground) as shown in FIG. 7, the specified direction may be from the top down (a scene simulated at this time is the one in which the user wearing the wearable device jumps down, or squats down) or from the bottom up (a scene simulated at this time is the one in which the user wearing the wearable device jumps up). The x-axis, y-axis, and z-axis described above may be preset coordinate axes in a specified three-dimensional coordinate system. Please refer to FIGS. 4 and 5 for the reference signs in FIGS. 6 and 7, which will not be repeated in detail here in the present disclosure.

In an alternative implementation, the first supporting post 04 in FIG. 5 may also be a telescopic supporting post (for example, a hydraulic or pneumatic supporting post), which may extend and retract up and down to drive the first test stage 05, on which the wearable device 1 and the first image acquisition component 021, to move vertically, achieving the same test result as the test system for the wearable device as shown in FIG. 7. That is to say, the scene in which the user wearing the wearable device jump down or squat down can be simulated. Beyond this, other alternations shall fall within the protection scope of the present disclosure, and are not limited in this embodiment of the present disclosure.

From FIGS. 4 to 7, a display direction of the image displayed by the display screen in the wearable device 1 (for example, when the display direction is a row direction of the image displayed by the display device) is parallel to the horizontal plane to simulate the scene when the user uses the wearable device. That is, at this time, if the user views the image displayed by the wearable device, the image is upright with respect to the user. Therefore, in FIGS. 4 to 6, the display direction of the image displayed by the display screen in the wearable device 1 is parallel to a bearing surface of the first test stage 05; and in FIG. 7, the display direction of the image displayed by the display screen in the wearable device 1 is perpendicular to the bearing surface of the first test stage 05.

Then, by adjusting the relative positions of respective devices in the test system for the wearable device, the time error of the wearable device in the horizontal scene and the vertical scene can be tested, thereby ensuring the practicability of the test system.

Figure 8:
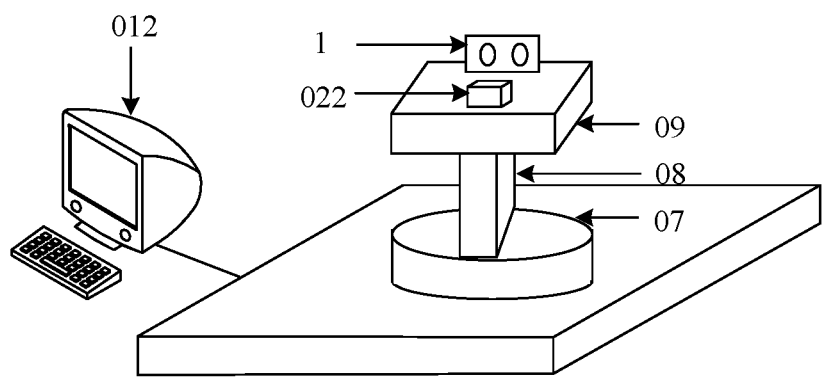
FIG. 8 is a schematic diagram of a structure of a second subsystem of a test system for a wearable device in accordance with an embodiment of the present disclosure.

FIG. 8 is a schematic diagram of a structure of a second subsystem of a test system for the wearable device in accordance with an embodiment of the present disclosure. As shown in FIG. 8, the second subsystem includes: a second controller 012, a second image acquisition component 022, a base 07, a second supporting post 08, and a second test stage 09, wherein the second supporting post 08 has one end rotatably connected to the base 07, and has the other end fixedly connected to the second test stage 09; the second controller 012 establishes a communication connection with the second supporting post 08, and the communication connection may be made in a wired or wireless manner.

The second test stage 09 is configured for the placement of the wearable device 1 and the second image acquisition component 022; the second controller 012 is configured to control the second supporting post 08 to rotate on the base 07; and the second supporting post 08 is configured to support the rotation of the second test stage 09 on the base 07, and may be adaptively adjusted in the shape and structure to support the second test stage 09.

As an example, the second controller 012 may preset an angle that will be rotated by base 07 along a rotational direction with respect to the starting position (i.e., an initial position when entering the test process) to reach the target position. When Step 201 above is performed, the second controller 012 may control the base 07 to rotate, so that the second supporting post 08 drives the second test stage 09, which is equipped with the wearable device 1 and the second image acquisition component 022, to rotate clockwise or counterclockwise along an axis, at which the supporting post 08 is located, to enter the test process. In the test process, the wearable device 1 continuously displays the test image, and the second image acquisition component 022 continuously shoots the display screen of the wearable device 1 and transmits shot images to the second controller 012. Then, the second controller 012 executes Steps 202 to 205 above according to the acquired images.

Figure 9:
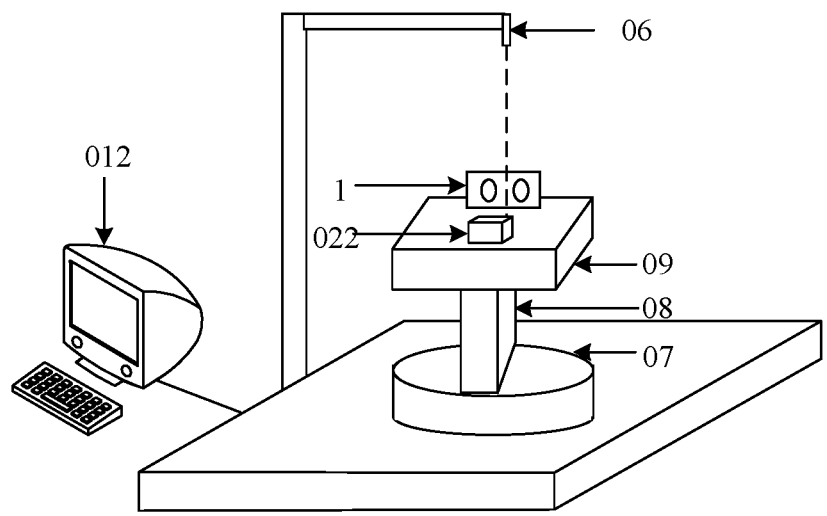
FIG. 9 is a schematic diagram of a structure of a second subsystem of another test system for a wearable device in accordance with an embodiment of the present disclosure.

FIG. 9 is a schematic diagram of a structure of a second subsystem of another test system for the wearable device in accordance with an embodiment of the present disclosure. As shown in FIG. 9, the test system 0 for the wearable device may further include: a laser emitter 06 configured to provide laser light. The laser emitter 06 may be disposed at a position corresponding to the target position, for example at a side of the target position. The laser emitter 06 is configured to emit the laser light to a place between the display screen of the wearable device 1 and the lens of the second image acquisition component 022 when the wearable device 1 is at the target position.

Correspondingly, when Step 201 above is performed, the laser emitter 06 emits the laser light to a place between the display screen of the wearable device 1 and the lens of the second image acquisition component 022. In one aspect, the laser emitter 06 may emit the laser light when the wearable device 1 reaches the target position. As an example, the laser emitter 06 may be provided with a timer, which starts counting-down when the wearable device 1 starts moving and stops counting-down when the wearable device 1 stops moving, triggering the laser emitter 06 to emit the laser light. The duration of the counting-down is calculated according to an angle by which the base 07 is required to rotate along one rotational direction from the starting position, and the rotation speed of the second supporting post 06. In another aspect, the laser emitter 06 may also emit the laser light throughout the test process to avoid the influence of a laser emission delay of the laser emitter 06 on a finally determined time error, thereby to further improve the test accuracy.

Figure 10:
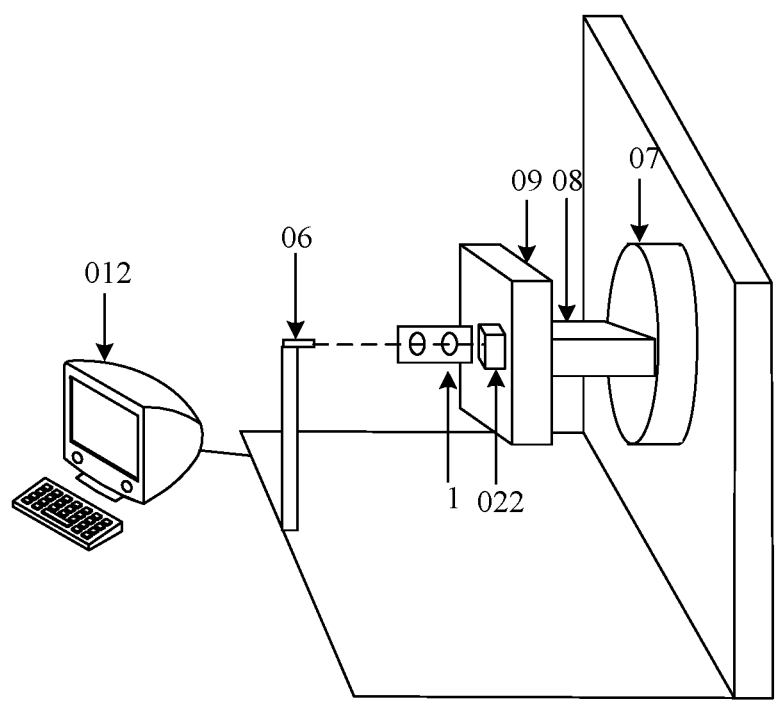
FIG. 10 is a schematic diagram of a structure of a second subsystem of another test system for a wearable device in accordance with an embodiment of the present disclosure.

In an alternative implementation, the base 07 above is adjustable in position, and when the position of the base changes, other devices in the test system for the wearable device may be adjusted in self position with the base as a reference system. Correspondingly, the specified direction above is a different direction. For example, when the base is horizontally disposed as shown in FIG. 9, the specified direction is a clockwise or counterclockwise rotational direction along an axis that is perpendicular to the horizontal plane, and the scene simulated at this time is that the user wearing the wearable device makes actions such as turning a corner, turning back, or turning the head from side to side, somewhere. FIG. 10 is a schematic diagram of a structure of another test system for the wearable device in accordance with an embodiment of the present disclosure. When the base is vertically disposed as shown in FIG. 10, the specified direction is a clockwise or counterclockwise rotational direction parallel to the axis of the horizontal plane, and the scene simulated at this time is that when the user wearing the wearable device makes actions such as raising the head, lowering the head or bending down.

From FIGS. 8 to 10, a display direction of the image displayed by the display screen in the wearable device 1 is parallel to the horizontal plane to simulate the scene when the user uses the wearable device. Therefore, in FIGS. 8 to 9, the display direction of the image displayed by the display screen in the wearable device 1 is parallel to a bearing surface of the second test stage 09; and in FIG. 10, the display direction of the image displayed by the display screen in the wearable device 1 is perpendicular to the bearing surface of the second test stage 09.

Alternatively, the tester may also simulate the scene in which the user wearing the wearable device makes a movement by adjusting the position of the wearable device 1 described above. For example, the wearable device 1 in FIG. 9 may be placed vertically, which is not limited here in this embodiment of the present disclosure.

Then, by adjusting the relative positions of respective devices in the test system for the wearable device, the time error of the wearable device in the horizontal scene and the vertical scene can be tested, thereby to ensure the practicability of the test system.

In the second implementation, the test system for the wearable device may be provided with only one system, which may either test the time error with defining the linear direction as the specified direction, or test the time error with defining the rotational direction as the specified direction. The test system for the wearable device includes: a controller, an image acquisition component, a laser emitter, a linear slide rail, a first supporting post with one end slidably connected to the linear sliding rail, a first test stage fixedly connected to the other end of the first supporting post, and a sliding connector.

Among these, the controller has a communication connection with the first supporting post; the first test stage is fixedly provided with a wearable device and an image acquisition component; and the controller is configured to control the first supporting post to slide to a target position along a specified direction on the linear sliding rail. The first supporting post has one end rotatably connected to the sliding connector, and the sliding connector is slidably connected to the linear slide rail. The first supporting post has one end rotatably connected to the linear slide rail via the sliding connector.

Figure 11:
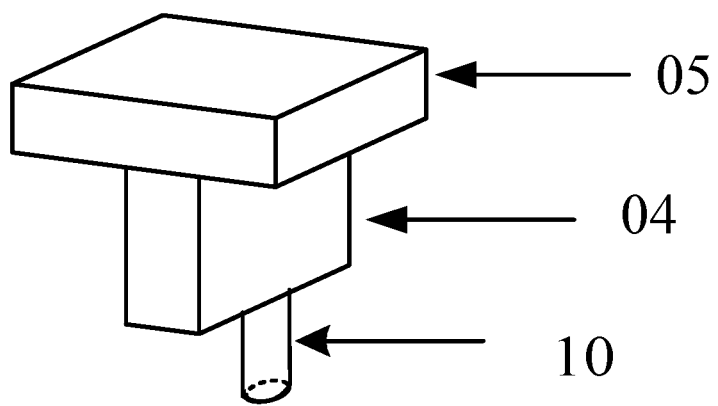
FIG. 11 is a schematic diagram of a structure of a sliding connector in a test system for a wearable device in accordance with an embodiment of the present disclosure.

As an example, FIG. 11 is a schematic diagram of a structure of a sliding connector in a test system for the wearable device in accordance with this embodiment of the present disclosure. The schematic diagrams of structures of other modules may be as shown in FIG. 4 to FIG. 7. As shown in FIG. 11, the sliding connector 10 is arranged at one end of the first supporting post 04, and by rotating the sliding connector 10, the first supporting post 04 drives the first test stage, which is provided with the wearable device 1 and the image acquisition component 021, to rotate, thereby to achieve the function of measuring the time error when the wearable device moves along the rotational direction as the specified direction, as shown in FIGS. 4 to 7.

In the test system for the wearable device, the positions of respective modules can be schematically adjusted according to a specific scene. As an example, the supporting post and the test stage may be movably connected, and the relative positions between the two may be adjusted according to actual test requirements. The placement of the image acquisition component and the wearable device on the test stage may also be adjusted according to the actual test requirements and the relative position between the supporting post and the test stage. For example, the wearable device may be placed vertically or horizontally. Furthermore, for the test system with the laser emitter, the position of the laser emitter may also be adjusted correspondingly after the placement of the image acquisition component and the wearable device is adjusted, so as to meet the test requirements. For instance, the position of the laser emitter is adjusted so that the laser light emitted by the laser emitter is located between the image acquisition component and the wearable device.

Taking the first subsystem as an example, the first test stage 05 may be movably connected to the first supporting post 04. For example, the first test stage 05 may rotate on the first supporting post 04, or may be folded (forwards or backwards, for example) relative to the first supporting post 04. For example, the first test stage 05 in FIG. 4 may be folded to a position that is parallel to the extension direction of the first supporting post 04, so that the test system can achieve the test results shown in FIG. 7 after the stage is folded.

Similarly, taking the second subsystem as an example, the second supporting post 08 may be movably connected to the second test stage 09. For example, the second supporting post 08 may rotate on the second test stage 09, or may be folded relatively to the second supporting post 08.

To allow the first supporting post 04 in FIGS. 4 to 7 to move along the linear direction on the linear sliding rail 03 under the control of the controller 011, and to allow the second supporting post 08 in FIGS. 8 to 10 to rotate along the rotation direction under the control of the controller 012, a drive module may be installed inside or outside the first supporting post 04 and the second supporting post 08. The drive module may be an electric machine or a motor or the like, and is configured to drive the corresponding supporting post to move, the details of which will not be described here in this embodiment of the present disclosure.

In summary, with the test method provided by the embodiment of the present disclosure, the wearable device displaying a test image is controlled to move upwards in a specified direction, and two images displayed by the wearable device and specified parameters of the two images are acquired, based on which the time error of the wearable device is determined. As the accuracy of measured time error is significantly higher than that of the maximum time error, the problem of low accuracy of the time error is solved, thereby the result of effectively improving the accuracy of the determined display errors is achieved.

In a second aspect, when the display error is a movement error, the display screen of the wearable device further displays a dynamic visual coordinate system, wherein the dynamic visual coordinate system is an internal coordinate system of the wearable device, and the scales in the coordinate system will change along with the movement of the wearable device. The world coordinate system is an external coordinate system of the wearable device, and the dynamic visual coordinate system has a mapping relationship with the world coordinate system. The mapping relationship includes: a dimensional proportion relationship, a relative position relationship and the like, wherein the relative position relationship may include an angle relationship, for example, an image in the dynamic visual coordinate system is a reduced image being one tenth of the image in the world coordinate system, and the angle relationship between the two is 1:1, the details of which will not be repeated here in this embodiment of the present disclosure. The two images in Step 102 above include a third image and a fourth image, and the specified parameters above are the scales of the two images on the dynamic visual coordinate system. The scale spacing on the dynamic visual coordinate system is not greater than the minimum spacing that is identifiable by the wearable device, thereby to ensure high measurement accuracy. The third and fourth images above are those meeting the second preset condition. For example, the third image is an image that is actually displayed when the wearable device changes from the motion state to the stationary state, and the fourth image is an image that is actually displayed when the wearable device changes from the motion state to the stationary state. In an alternative implementation, the second preset condition above may also be other cases. For example, the third image is a posterior b1-frame image of an image actually displayed when the wearable device changes from the stationary state to the motion state, and the fourth image is a posterior b2-frame image of an image actually displayed when the wearable device changes from the motion state to the stationary state. Both b1 and b2 are positive integers, for example, b1=1 or 2, b2=1 or 2, alternatively, b1=b2, or, b1 may not be equal to b2; and for example, an absolute value of a difference between the two is less than 2, as long as the accuracy of the time error calculated subsequently is within an acceptable error range.

In this embodiment of the present disclosure, the movement error in the linear direction can be measured, for instance, when the wearable device moves linearly, the movement error is the distance error; and moreover, the movement error in the rotational direction may also be measured, for instance, when the wearable rotates around an axis, the movement error is the angle error.

As an example, it is assumed that the third image is an image that is actually displayed when the wearable device changes from the stationary state to the motion state, and the fourth image is an image that is actually displayed when the wearable device changes from the motion state to the stationary state. In this embodiment of the present disclosure, the following two implementations are presented by way of example to illustrate the test method for the wearable device when the display error is the movement error.

Figure 12:
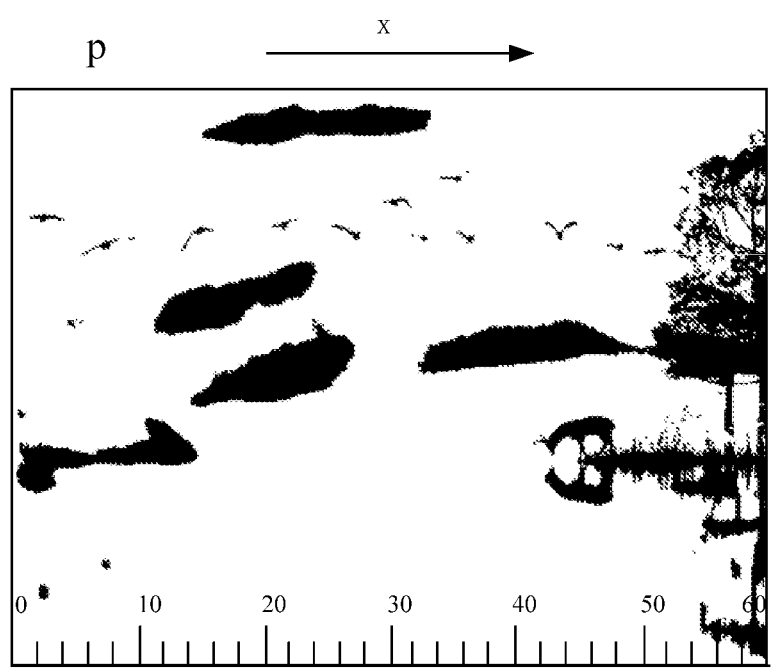
FIG. 12 is a schematic diagram of a display screen of a wearable device displaying a third image in accordance with an embodiment of the present disclosure.
Figure 13:
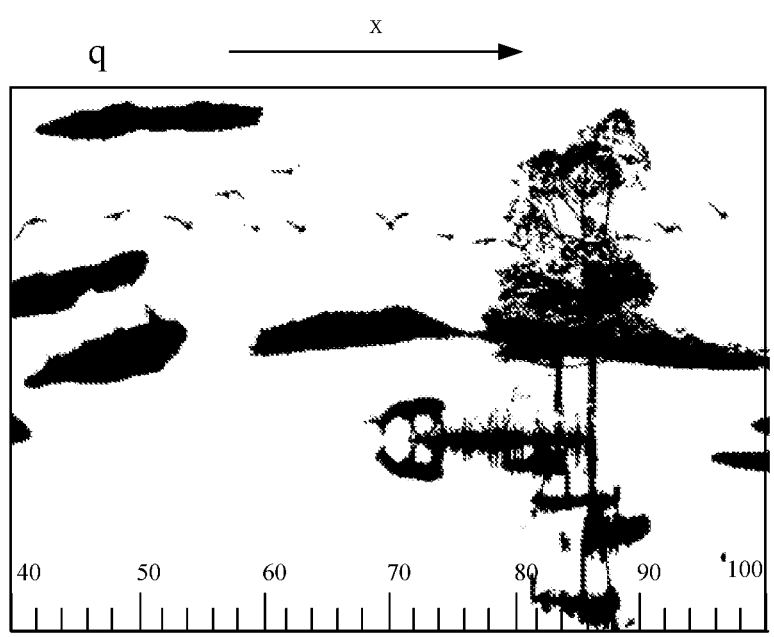
FIG. 13 is a schematic diagram of a display screen of a wearable device displaying a fourth image in accordance with an embodiment of the present disclosure.
Figure 14:
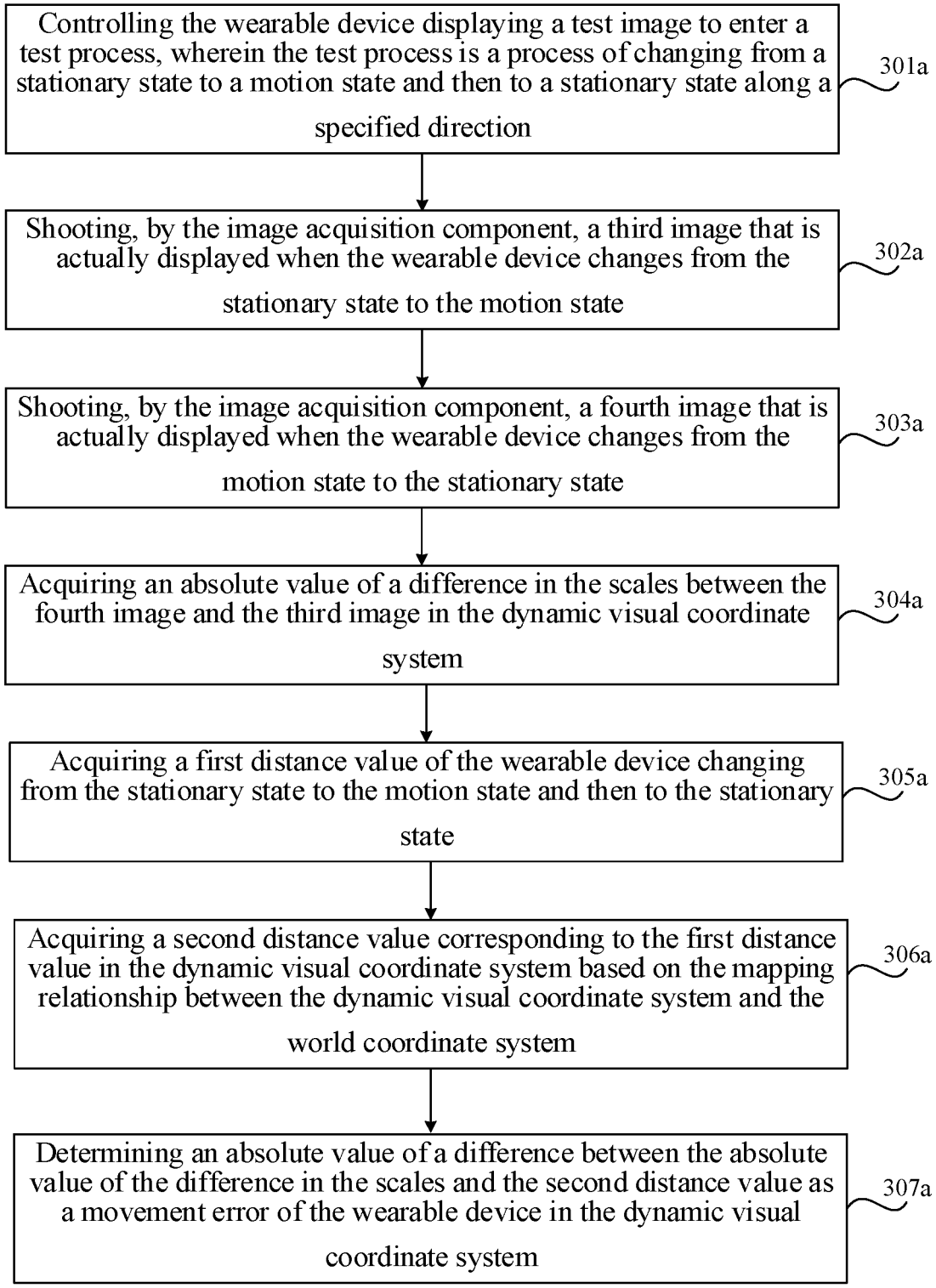
FIG. 14 is a flowchart of another test method for a wearable device in accordance with an embodiment of the present disclosure.

In the first implementation, FIG. 12 is a schematic diagram of a display screen of a wearable device displaying a third image in accordance with this embodiment of the present disclosure, and FIG. 13 is a schematic diagram of a display screen of a wearable device displaying a fourth image in accordance with this embodiment of the present disclosure. When the specified direction is the linear direction, the corresponding dynamic visual coordinate system is as shown in FIGS. 12 and 13, and may be a dynamic planar rectangular coordinate system. FIG. 14 is a flowchart of another test method for the wearable device in accordance with an embodiment of the present disclosure. The embodiment of the present disclosure provides a test method for the wearable device. As shown in FIG. 14, the test method for the wearable device includes the following steps.

In Step 301a, the wearable device displaying a test image is controlled to enter a test process, wherein the test process is a process of changing from a stationary state to a motion state and then to a stationary state along a specified direction.

This specified direction is a linear direction. For other processes, a reference may be made to Step 201 above, and the details will not be repeated here.

In Step 302a, the image acquisition component shoots the third image that is actually displayed when the wearable device changes from the stationary state to the motion state.

Referring to the description of Step 202 above, the embodiment of the present disclosure is still illustrated, by way of example, by using a video camera as the image acquisition component, with the frame frequency of 1000 frames/second. The lens of the video camera may aim at the display screen of the wearable device, and may start shooting when the wearable device starts to enter the test process (i.e., the time when the state of the wearable device changes from the stationary state to the motion state), thereby to obtain a set of images regarding the motion of the wearable device. The set of images includes a plurality of images that are continuously shot by the video camera and contains the display screen of the wearable device. The controller extracts, from the set of images, the first image of the set of images, i.e., the third image that is actually displayed when the wearable device changes from the stationary state to the motion state in this embodiment of the present disclosure.

In Step 303a, the image acquisition component shoots a fourth image that is actually displayed when the wearable device changes from the motion state to the stationary state.

As an example, the controller may extract, from the set of images acquired in Step 302a above, the first image that is displayed when the wearable device reaches the target position, i.e., the fourth image displayed when the wearable device changes from the motion state to the stationary state. The fourth image and the first image in Step 202 are the same image. Please refer to Step 202 for the detailed explanation, the details of which will not be repeated here.

In Step 304a, an absolute value of a difference in the scales between the fourth image and the third image in the dynamic visual coordinate system is acquired.

For the convenience of calculating the movement error, the scales of the boundary at the same side of the image on the dynamic visual coordinate system are typically selected as the scales of the image on the dynamic visual coordinate system. For instance, the scales of the boundary at the left side or the right side of the image on the dynamic visual coordinate system are all selected.

According to the scales of the fourth and third images displayed on the dynamic visual coordinate system in the display screen of the wearable device, as an example, the scales of the boundary at the left side of the images on the dynamic visual coordinate system are uniformly selected for the fourth and third images as parameters to calculate the movement error. As shown in FIGS. 12 and 13, it is assumed that the wearable device moves from left to right along an x direction. FIG. 12 is a schematic diagram of a display screen of the wearable device displaying a third image p. FIG. 13 is a schematic diagram of a display screen of the wearable device displaying a fourth image q. Among these, it is assumed that the coordinate origin of the dynamic visual coordinate system is located at the lower left corner of the third image p, and the scales of the dynamic visual coordinate system change with the change of the image displayed by the wearable device. As shown in FIGS. 12 and 13, when the wearable device moves from left to right along a linear direction, the displayed image also creates a visual impression of moving from left to right to people, and the corresponding scales of the dynamic visual coordinate system also slide from left to right on the display screen. Assuming that the minimum scale unit of the dynamic visual coordinate system is millimeter (mm), it may be seen from FIGS. 12 and 13 that the absolute value of a difference in the scales between the fourth image q and the third image p in the dynamic visual coordinate system is 40 mm.

In Step 305a, a first distance value of the wearable device changing from the stationary state to the motion state and then to the stationary state is acquired.

The first distance value is the value of a distance that the wearable device actually moves along the linear direction from the starting position. This distance value may be acquired by a distance sensor disposed on the wearable device, or by marking the scales on a moving path of the wearable device, which is not limited here in this embodiment of the present disclosure.

In Step 306a, a second distance value corresponding to the first distance value in the dynamic visual coordinate system is acquired based on the mapping relationship between the dynamic visual coordinate system and the world coordinate system.

As an example, the actual distance that the wearable device moves in the world coordinate system may be reduced based on the dimensional proportion relationship in the mapping relationship above, and converted into the scales in the dynamic visual coordinate system.

For example, assume a second distance value is 41 cm, and the images in the dynamic visual coordinate system shown in FIGS. 12 and 13 are reduced images which sizes are one tenth of the images in the world coordinate system, that is, the dimensional proportion relationship between the world coordinate system and the dynamic visual coordinate system is 10:1. Then, based on the mapping relationship between the dynamic visual coordinate system and the world coordinate system, the second distance value corresponding to the first distance value as acquired in the dynamic visual coordinate system is actually one tenth of the first distance value, that is 41 mm.

In Step 307a, an absolute value of a difference between the absolute value of the difference in the scales and the second distance value is determined as a movement error of the wearable device in the dynamic visual coordinate system.

Still referring to the example of Step 304a to Step 306a, with the second distance value being 41 mm and the absolute value of the difference in the scales being 40 mm, the absolute value of the difference between the absolute value of the difference in the scales and the second distance value is 1 mm, therefore the movement error of the wearable device in the dynamic visual coordinate system is 1 mm.

By accurately measuring the movement error of the wearable device, the tester may be allowed to correct the image display process of the wearable device based on the movement error.

When the first implementation is implemented, the corresponding test system for the wearable device can refer to the first subsystem in the first implementation or the test system for the wearable device in the second implementation regarding the measurement of the time error. As an example, based on the test system above, the distance value corresponding to the required scale may be acquired by adding the dynamic visual coordinate system to the display screen of the wearable device, and setting readable coordinates on the linear sliding rail.

Figure 15:
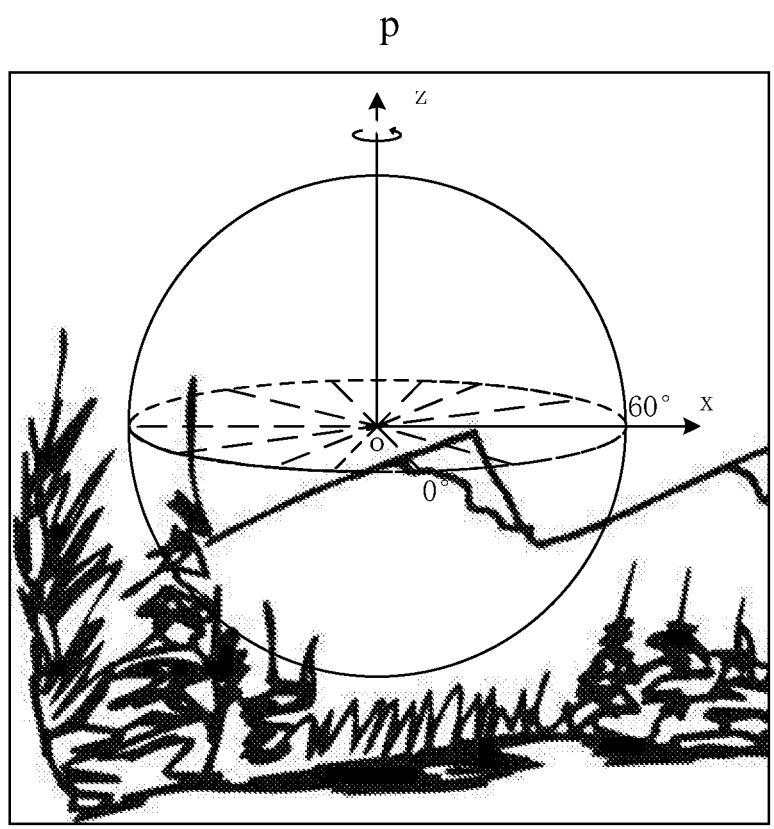
FIG. 15 is a schematic diagram of a display screen of another wearable device displaying a third image in accordance with an embodiment of the present disclosure.
Figure 16:
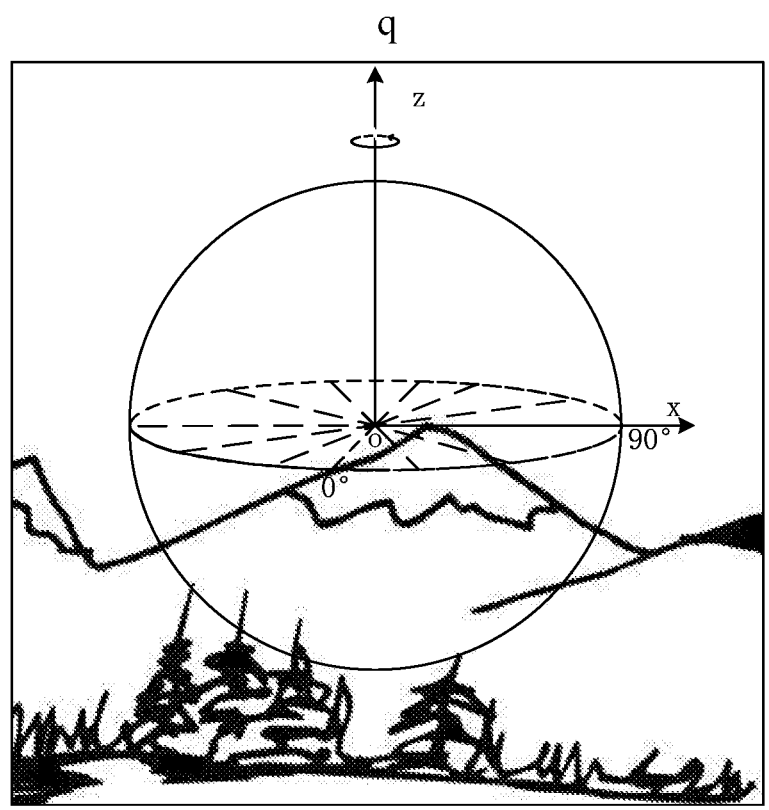
FIG. 16 is a schematic diagram of a display screen of another wearable device displaying a fourth image in accordance with an embodiment of the present disclosure.
Figure 17:
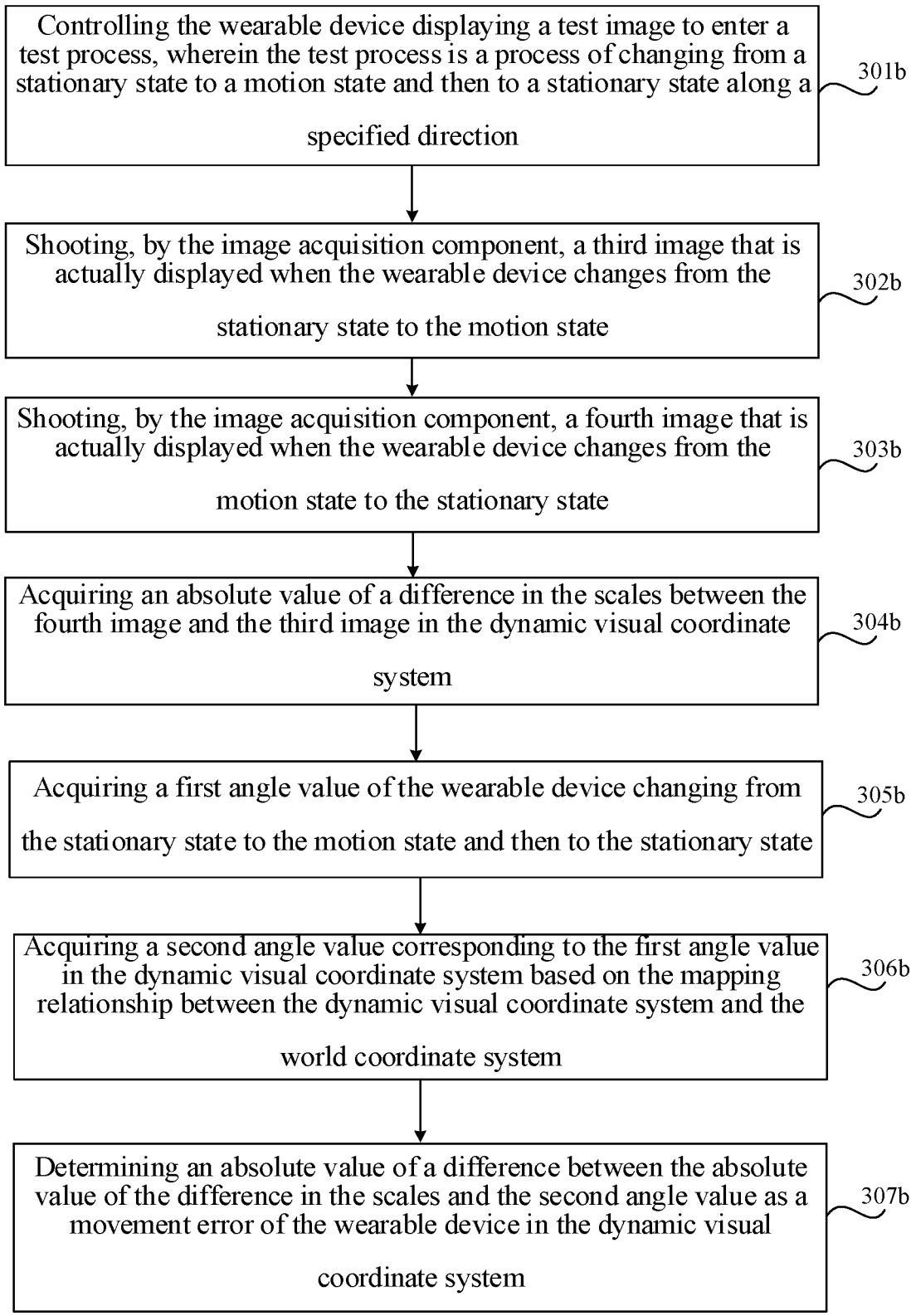
FIG. 17 is a flowchart of another test method for a wearable device in accordance with an embodiment of the present disclosure.

In a second implementation, FIG. 15 is a schematic diagram of a display screen of another wearable device displaying a third image p in accordance with an embodiment of the present disclosure. FIG. 16 is a schematic diagram of a display screen of another wearable device displaying a fourth image q in accordance with an embodiment of the present disclosure. When the specified direction is the rotational direction, the corresponding dynamic visual coordinate system as shown in FIGS. 15 and 16 may be a three-dimensional rectangular coordinate system, a spherical coordinate system, a polar coordinate system or a spherical polar coordinate system. FIGS. 15 and 16 depict the dynamic visual coordinate system as a spherical coordinate system by way of example. FIG. 17 is a flowchart of another test method for a wearable device in accordance with an embodiment of the present disclosure. The embodiment of the present disclosure provides a test method for the wearable device. As shown in FIG. 17, the test method for the wearable device includes the following steps.

In Step 301b, the wearable device displaying a test image is controlled to enter a test process, where the test process is a process of changing from a stationary state to a motion state and then to a stationary state along a specified direction.

This specified direction is the rotational direction. For other processes in Step 301b, a reference may be made to Step 201 above, and details will not be repeated here.

In Step 302b, the image acquisition component shoots the third image that is actually displayed when the wearable device changes from the stationary state to the motion state.

A reference can be made to Step 302a for the process of Step 302b, the details of which will not be repeated here.

In Step 303b, the image acquisition component shoots a fourth image that is actually displayed when the wearable device changes from the motion state to the stationary state.

A reference can be made to Step 303a for the process of Step 302b, the details of which will not be repeated here.

In Step 304b, an absolute value of a difference in the scales between the fourth image and the third image in the dynamic visual coordinate system is acquired.

In this embodiment, the absolute value of a difference in the scales between the fourth image and the third image in the dynamic visual coordinate system is the absolute value of the angular difference in the scales.

As an example, as shown in FIG. 15 and FIG. 16, it is assumed that the coordinate position of the image initially displayed by the wearable device is located at 0° of the dynamic visual coordinate system. The angular scales in the dynamic visual coordinate system change as the image displayed by the wearable device changes. Assume that the minimum unit of the angular scales in the dynamic visual coordinate system is 30°, then as shown in FIGS. 15 and 16, when the wearable device moves counterclockwise along the z-axis, the image displayed by the wearable device also creates a visual impression of counterclockwise motion for people, and the scales of the corresponding dynamic visual coordinate system also rotate counterclockwise on the display screen. Then, based on FIGS. 15 and 16, it may be seen that the third image p is rotated by 60° relatively to the position where the initial coordinate is 0°, and the fourth image q is rotated by 90° in relative to the position where the initial coordinate is 0°, and the absolute value of an angular difference in the scales between the fourth image q and the third image p in the dynamic visual coordinate system is 30°.

In Step 305b, a first angle value of the wearable device changing from the stationary state to the motion state and then to the stationary state is acquired.

This first angle value is the value of an angle that the wearable device actually rotates from the starting position along the rotational direction (as an example, along the counterclockwise direction). This angle value may be acquired by an angle sensor disposed on the wearable device, or by marking the scales on the moving path of the wearable device, which is not limited here in this embodiment of the present disclosure.

In Step 306b, a second angle value corresponding to the first angle value in the dynamic visual coordinate system is acquired based on the mapping relationship between the dynamic visual coordinate system and the world coordinate system.

As an example, the actual angle that the wearable device rotates in the world coordinate system may be converted into an angle in the dynamic visual coordinate system based on the angular relationship in the above mapping relationship.

For example, it is assumed that the first angle value is 29°, and the relationship between the angle in the dynamic visual coordinate system and the angle in the world coordinate system as shown in FIGS. 15 and 16 is 1:1. Then, based on the mapping relationship between the dynamic visual coordinate system and the world coordinate system, the second angle value corresponding to the first angle value as acquired in the dynamic visual coordinate system is actually 29°.

In Step 307b, an absolute value of a difference between the absolute value of the difference in the scales and the second angle value is determined as a movement error of the wearable device in the dynamic visual coordinate system.

In this embodiment, the movement error is actually an angular movement error. Still refer to the example of Step 304b to Step 306b, with the second angle value being 29° and the absolute value of the angle difference in the scales being 30°, the absolute value of the difference between the absolute value of the difference in the scales and the second angle value is 1°, and then, the angle movement error of the wearable device in the dynamic visual coordinate system is 1°.

By accurately measuring the movement error of the wearable device, a tester may be allowed to correct the image display process of the wearable device based on the movement error.

Alternatively, after Step 304a or 304b, the controller may also: acquire a third movement parameter value corresponding to the absolute value of the difference in the scales in the world coordinate system based on the mapping relationship between the dynamic visual coordinate system and the world coordinate system; acquire a first movement parameter value of the wearable device changing from a stationary state to a motion state and then to a stationary state; determine an absolute value of a difference between the third movement parameter value and the first movement parameter value as a movement error of the wearable device in the world coordinate system; and then convert the movement error of the wearable device in the world coordinate system into the movement error of the wearable device in the dynamic visual coordinate system based on the mapping relationship between the dynamic visual coordinate system and the world coordinate system.

As an example, when the movement parameter is a distance value, the controller may: acquire a first distance value corresponding to the absolute value of the difference in the scales in the world coordinate system based on the mapping relationship between the dynamic visual coordinate system and the world coordinate system; acquire a second distance value of the wearable device changing from a stationary state to a motion state and then to a stationary state; determine an absolute value of a difference between the first distance value and the second distance value as a movement error of the wearable device in the world coordinate system; and then convert the movement error of the wearable device in the world coordinate system into the movement error of the wearable device in the dynamic visual coordinate system based on the mapping relationship between the dynamic visual coordinate system and the world coordinate system.

When the movement parameter is an angle value, the controller may: acquire a first angle value corresponding to the absolute value of the difference in the scales in the world coordinate system based on the mapping relationship between the dynamic visual coordinate system and the world coordinate system; acquire a second angle value of the wearable device changing from a stationary state to a motion state and then to a stationary state; determine an absolute value of a difference between the first angle value and the second angle value as a movement error of the wearable device in the world coordinate system; and then convert the movement error of the wearable device in the world coordinate system into the movement error of the wearable device in the dynamic visual coordinate system based on the mapping relationship between the dynamic visual coordinate system and the world coordinate system.

When the second method is implemented, the corresponding test system for the wearable device may refer to the second subsystem in the first implementation or the test system for the wearable device in the second implementation regarding the measurement of the time error. Based on the test system above, the distance value corresponding to the required scale may be acquired by adding the dynamic visual coordinate system to the display screen of the wearable device, and setting readable angle identifiers on the base.

In summary, the test method according to this embodiment of the present disclosure includes the following steps: controlling the wearable device displaying the test image to move upwards in the specified direction; acquiring the fourth image and the third image displayed by the wearable device; and determining the movement error of the wearable device according to the absolute value of the difference in the scales between the two images. As the accuracy of measured movement error is significantly higher than that of the maximum movement error, the problem of low accuracy of the movement error is solved, thereby effectively improving the accuracy of the determined movement error.

From the embodiments described above, it may be seen that in the present disclosure, the display errors of the wearable device are determined by controlling the wearable device displaying the test image to move upwards in the specified direction, and acquiring two images displayed by the wearable device and specified parameters of the two images. As the accuracy of measured display errors are significantly higher than that of the maximum display errors, the problem of low accuracy of the display errors is solved, thereby the effective improvement of the accuracy of the determined display errors is achieved.

An embodiment of the present disclosure provides a test system 0 for a wearable device. The test system may be the test system 0 shown in FIG. 1 and include:

a controller 01 and an image acquisition component 02, wherein the controller 01 is configured to control a wearable device displaying a test image to enter a test process, and the test process is a process of changing from a stationary state to a motion state and then to a stationary state along a specified direction;

the image acquisition component 02 is configured to acquire two images displayed by the wearable device in the test process; and the controller 01 is further configured to determine display errors of the wearable device based on a difference in specified parameters of the two images.

In summary, with the test method provided by the embodiment of the present disclosure, the wearable device displaying the test image is controlled to move upwards in the specified direction, and two images displayed by the wearable device and specified parameters of the two images are acquired, based on which the display errors of the wearable device are determined. As the accuracy of measured display errors are significantly higher than that of the maximum display errors, the problem of low accuracy of the display errors is solved, thereby the effective improvement of the accuracy of the determined display errors is achieved.

Alternatively, the display errors include a time error; the two images include a first image and a second image; and the specified parameter is a shooting frame number of the first image and a shooting frame number of the second image.

The controller 01 is configured to:

shoot, by an image acquisition component 02, a first image that is actually displayed when the wearable device changes from the motion state to the stationary state;

shoot, by the image acquisition component 02, a second image that is displayed when the wearable device changes from the motion state to the stationary state, wherein the second image is an end image displayed for the first time, and the end image is an image that should be displayed when the wearable device changes from the motion state to the stationary state if without the time error;

determine a difference in the shooting frame number between the first image and the second image according to the shooting frame number of the first image and the shooting frame number of the second image; and determine a time error of the wearable device according to the absolute value of the difference in the shooting frame number and a frame frequency of the image acquisition component.

Alternatively, the controller 01 is configured to:

determine a time error t of the wearable device based on a time error calculation formula according to an absolute value |n| of the difference in the shooting frame number between the first image and the second image, and a frame frequency f of the image acquisition component, wherein the time error calculation formula is:

$$t = \frac{|n|+1}{f}.$$

Alternatively, the display screen of the wearable device further displays a dynamic visual coordinate system, which has a mapping relationship with a world coordinate system; the display errors include a movement error; and the specified parameters are scales of the two images on the dynamic visual coordinate system.

The controller 01 is configured to:

shoot, by the image acquisition component, a third image that is actually displayed when the wearable device changes from the stationary state to the motion state;

shoot, by the image acquisition component, a fourth image that is actually displayed when the wearable device changes from the motion state to the stationary state;

acquire an absolute value of a difference in the scales between the fourth image and the third image in the dynamic visual coordinate system;

acquire a first movement parameter value of the wearable device changing from the stationary state to the motion state and then to the stationary state;

acquire a second movement parameter value corresponding to the first movement parameter value in the dynamic visual coordinate system based on the mapping relationship between the dynamic visual coordinate system and the world coordinate system;

determine an absolute value of a difference between the absolute value of the difference in the scales and the second movement parameter value as a movement error of the wearable device in the dynamic visual coordinate system;

wherein when the specified direction is a linear direction, the movement parameter value is a distance value; and when the specified direction is a rotational direction, the movement parameter value is an angle value.

Alternatively, as shown in FIG. 4, the system 0 further includes:

a linear slide rail 03, a first supporting post 04, and a first test stage 05, wherein the first supporting post 04 has one end slidably connected to the linear slide rail 03, and has the other end fixedly connected to the first test stage 05; the controller 01 establishes a communication connection with the first supporting post 04; the first test stage is configured for the placement of the wearable device 1 and the image acquisition component 02; and the controller 01 is configured to control the first supporting post 04 to slide on the linear slide rail 03.

As shown in FIG. 11, the system 0 further includes:

a sliding connector 10,

The sliding connector 10 may be arranged in the system shown in FIG. 4. Refer to FIG. 4, one end of the first supporting post 04 is rotatably connected to the sliding connector 10, and the sliding connector 10 is slidably connected to the linear sliding rail 03.

Alternatively, as shown in FIG. 8, the system 0 further includes:

a base 07, a second supporting post 08, and a second test stage 09, wherein the second supporting post 08 has one end rotatably connected to the base 07, and has the other end fixedly connected to the second test stage 09; and a communication connection is established between the controller 01 and the second supporting post 08.

The second test stage 09 is configured for the placement of the wearable device 1 and the second image acquisition component 02; and the controller 01 is configured to control the second supporting post 08 to rotate on the base 07.

Alternatively, the controller 01 is configured to:

control the wearable device to move to a target position at a preset speed from a starting position along a specified direction and then become stationary, wherein the target position is provided with a calibration object; and when the wearable device is located at the target position, the calibration object is located between the display screen of the wearable device and a lens of the image acquisition component.

Alternatively, as shown in FIG. 5, the calibration object is laser light, and the system 0 further includes: a laser emitter 06 configured to provide the laser light. The laser emitter 06 may emit the laser light to a place between the display screen of the wearable device 1 and the lens of the first image acquisition component 02 when the wearable device 1 is at the target position.

Alternatively, the controller 01 is configured to:

control the wearable device to move to a target position at a preset speed constantly from a starting position along a linear direction and then become stationary;

or, control the wearable device to move to the target position at a preset rotation speed constantly from a starting position along a rotational direction and then become stationary.

Alternatively, when the specified direction is a linear direction, and the preset speed is 0.1 m/s to 5 m/s.

Or, when the specified direction is a rotational direction, and the preset speed is 1 r/min to 5 r/min.

Alternatively, the specified direction is a linear direction, and the movement error is a distance error;

or, the specified direction is a rotational direction, and the movement error is an angle error.

It should be noted that the system may also be any one of the systems in FIG. 5 to FIG. 7 and FIG. 9 to FIG., the details of which will not be repeated here in this embodiment of the present disclosure.

In summary, with the test method provided by the embodiment of the present disclosure, the wearable device displaying the test image is controlled to move upwards in the specified direction, and two images displayed by the wearable device and specified parameters of the two images are acquired, based on which the display errors of the wearable device are determined. As the accuracy of measured display errors are significantly higher than that of the maximum display errors, the problem of low accuracy of the display error is solved, thereby the effective improvement of the accuracy of the determined display errors is achieved.

The embodiment of the present disclosure further provides a test apparatus for a wearable device, which may be a computer, a processor, or other apparatuses integrated with computing or processing functions. The test apparatus may be integrated in the first processing module, the second processing module or the processing module as described above. The test device includes:

a processor;

a memory for storing executable instructions of the processor;

wherein the processor may implement any one of the test methods for the wearable device described above according to the present disclosure.

An embodiment of the present disclosure further provides a computer readable storage medium. When instructions in the computer readable storage medium are executed by a processing module, the processing module is enabled to execute any one of the test methods for the wearable device described above according to the present disclosure.

An embodiment of the present disclosure further provides a computer program product, in which instructions are stored. When the computer program is run on a computer, one of the test methods for the wearable device described above according to the present disclosure will be executed.

An embodiment of the present disclosure further provides a chip, which includes a programmable logic circuit, and/or program instructions. The chip is configured to implement any one of the test methods for the wearable device as described above according to the present disclosure.

A person skilled in the art may clearly understand that for the convenience and brevity of the description, and a reference may be made to the corresponding processes in the foregoing method embodiments for the working processes of the system, module and apparatus as described above, the details of which will not be repeated here.

In the present disclosure, the terms "first", "second", "third" and "fourth" are for descriptive purposes only and are not to be construed as indicating or implying relative importance. The term "a plurality of" refers to two or more, unless otherwise specifically defined.

In the several embodiments provided by the present disclosure, it should be understood that the disclosed apparatus and method could be implemented in other manners. For example, the apparatus embodiments described above are merely illustrative. For example, the division of the unit is only a logical function division, and there may be other division manners in actual implementation, for example, multiple units or modules may be combined or may be integrated into another system, or some features may be ignored or not executed. For another point, the mutual coupling or direct coupling or communication connection as shown or discussed may be indirect coupling or communication connection enabled via some interfaces, apparatuses or units, and may be in electrical, mechanical or other forms.

A unit described as a separate part may be or may be not physically separated, and a part displayed as a unit may be or may be not a physical unit, which may be located in one place or distributed on a plurality of network units. Some or all of the units may be selected to achieve the object of the solutions of the embodiments according to actual requirements.

Persons of ordinary skills in the art can understand that all or some of the steps described in the above embodiments can be completed through hardware, or through relevant software instructed by a program stored in a non-transitory computer readable storage medium, such as read-only memory, disk or CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A test method for a wearable device, comprising:
controlling the wearable device displaying a test image to enter a test process, the test process being a process of changing from a stationary state to a motion state and then to a stationary state along a specified direction;
acquiring two images displayed by the wearable device in the test process; and
determining display errors of the wearable device according to a difference in specified parameters of the two images.

2. The method according to claim 1, wherein the display errors comprise a time error, the two images comprise a first image and a second image, and the specified parameters are a shooting frame number of the first image and a shooting frame number of the second image.

3. The method according to claim 2, wherein
the acquiring two images displayed by the wearable device in the test process comprises:
shooting, by an image acquisition component, a first image that is actually displayed when the wearable device changes from the motion state to the stationary state; and
shooting, by the image acquisition component, a second image that is displayed when the wearable device changes from the motion state to the stationary state, wherein the second image is an end image displayed for the first time, and the end image is an image that should be displayed when the wearable device changes from the motion state to the stationary state without the time error.

4. The method according to claim 2, wherein
the determining the display errors of the wearable device according to the difference in the specified parameters of the two images comprises:
determining an absolute value of a difference in the shooting frame number between the first image and the second image according to the shooting frame number of the first image and the shooting frame number of the second image; and
determining the time error of the wearable device according to the absolute value of the difference in the shooting frame number and a frame frequency of the image acquisition component.

5. The method according to claim 4, wherein
the determining the time error of the wearable device according to the absolute value of the difference in the shooting frame number and the frame frequency of the image acquisition component comprises:
determining a time error t of the wearable device based on a time error calculation formula according to an absolute value $|n|$ of the difference in the shooting frame number between the first image and the second image, and a frame frequency f of the image acquisition component, wherein the time error calculation formula is:

$$t = \frac{|n|+1}{f}.$$

6. The method according to claim 1, wherein a display screen of the wearable device further displays a dynamic visual coordinate system, which has a mapping relationship with a world coordinate system; the display errors comprise a movement error; and the specified parameters are scales of the two images on the dynamic visual coordinate system.

7. The method according to claim 6, wherein the two images comprise a third image and a fourth image, and
the acquiring the two images displayed by the wearable device in the test process comprises:
shooting, by an image acquisition component, the third image that is actually displayed when the wearable device changes from the stationary state to the motion state; and
shooting, by the image acquisition component, the fourth image that is actually displayed when the wearable device changes from the motion state to the stationary state.

8. The method according to claim 6, wherein the two images comprise a third image and a fourth image, and
the determining the display errors of the wearable device according to the difference in specified parameters of the two images comprises:
acquiring an absolute value of a difference in the scales between the fourth image and the third image in the dynamic visual coordinate system;
acquiring a first movement parameter value of the wearable device changing from the stationary state to the motion state and then to the stationary state;
acquiring a second movement parameter value corresponding to the first movement parameter value in the dynamic visual coordinate system based on the mapping relationship between the dynamic visual coordinate system and the world coordinate system, and
determining an absolute value of a difference between the absolute value of the difference in the scales and the second movement parameter value as a movement error of the wearable device in the dynamic visual coordinate system.

9. The method according to claim 8, wherein
when the specified direction is a linear direction, the first movement parameter value and the second movement parameter value are distance values; and
when the specified direction is a rotational direction, the first movement parameter value and the second movement parameter value are angle values.

10. The method according to claim 1, wherein
the controlling the wearable device displaying the test image to enter the test process comprises:
controlling the wearable device to move to a target position at a preset speed from a starting position along a specified direction and then become stationary, wherein the target position is provided with a calibration object; when the wearable device is located at the target position, the calibration object is located between a display screen of the wearable device and an image acquisition component; and the image acquisition component is configured to acquire an image displayed on the display screen.

11. The method according to claim 10, wherein
the controlling the wearable device to move to the target position at the preset speed from the starting position along the specified direction and then become stationary comprises:
controlling the wearable device to move to the target position at the preset speed constantly from the starting position along one of a linear direction and a rotational direction and then become stationary.

12. The method according to claim 10, wherein
when the specified direction is a linear direction, and the preset speed is any speed value ranging from 0.1 m/s to 5 m/s; when the specified direction is a rotational direction, and the preset speed is any speed value ranging from 1 r/min to 5 r/min.

13. The method according to claim 10, wherein the calibration object is laser light.

14. A test apparatus for a wearable device, comprising:
a processor; and
a memory for storing executable instructions of the processor;
wherein when executing the executable instructions, the processor is capable of implementing the test method for the wearable device according to claim 1.

15. A computer readable storage medium,
wherein when instructions in the computer readable storage medium are executed by a processing component, the processing module is enabled to implement the test method for the wearable device according to claim 1.

16. A test system for a wearable device, comprising:
a controller and an image acquisition component, wherein
the controller is configured to control a wearable device displaying a test image to enter a test process, the test process being a process of changing from a stationary state to a motion state and then to a stationary state along a specified direction;
the image acquisition component is configured to acquire two images displayed by the wearable device in the test process; and the controller is further configured to determine display errors of the wearable device based on a difference in specified parameters of the two images.

17. The system according to claim 16, further comprising:

a linear slide rail, a first supporting post, and a first test stage, wherein the first supporting post has one end slidably connected to the linear slide rail, and has the other end fixedly connected to the first test stage, the first test stage is configured for placement of the wearable device and the image acquisition component, and the controller is configured to control the first supporting post to slide over the linear slide rail.

18. The system according to claim 17, further comprising:

a sliding connector, wherein the first supporting post has one end rotatably connected to the sliding connector, and the sliding connector is slidably connected to the linear slide rail.

19. The system according to claim 16, further comprising:

a base, a second supporting post, and a second test stage, wherein the second supporting post has one end rotatably connected to the base, and has the other end fixedly connected to the second test stage;

the test stage is configured for placement of the wearable device and the image acquisition component, and the controller is configured to control the second supporting post to rotate on the base.

20. The system according to claim 16, wherein the test image is an augmented reality image or a virtual reality image.

* * * * *